United States Patent
Jarzomski (12)

(10) Patent No.: US 12,441,391 B2
(45) Date of Patent: Oct. 14, 2025

(54) COMPLIANT SHAFT-ROTOR COUPLING FOR IMPROVED END STOP EXIT

(71) Applicant: LORD Corporation, Cary, NC (US)

(72) Inventor: Michael Jarzomski, Apex, NC (US)

(73) Assignee: LORD Corporation, Cary, NC (US)

( * ) Notice: Subject to any disclaimer, the term of this patent is extended or adjusted under 35 U.S.C. 154(b) by 720 days.

(21) Appl. No.: 17/788,920

(22) PCT Filed: Dec. 22, 2020

(86) PCT No.: PCT/US2020/066612
§ 371 (c)(1),
(2) Date: Jun. 24, 2022

(87) PCT Pub. No.: WO2021/133803
PCT Pub. Date: Jul. 1, 2021

(65) Prior Publication Data
US 2023/0032374 A1 Feb. 2, 2023

Related U.S. Application Data

(60) Provisional application No. 62/953,655, filed on Dec. 26, 2019.

(51) Int. Cl.
*B62D 5/00* (2006.01)

(52) U.S. Cl.
CPC .......... *B62D 5/006* (2013.01); *F16D 2300/18* (2013.01)

(58) Field of Classification Search
CPC .................................. B62D 5/005; B62D 5/006
See application file for complete search history.

(56) References Cited

U.S. PATENT DOCUMENTS

| | | | | |
|---|---|---|---|---|
| 7,810,605 B2* | 10/2010 | Kasahara | ............... | B62D 5/003 180/402 |
| 11,697,450 B2* | 7/2023 | Schemmel | ............. | B62D 5/006 180/402 |

(Continued)

FOREIGN PATENT DOCUMENTS

WO    WO-2022123088 A1 *  6/2022    ............... G05G 5/03

OTHER PUBLICATIONS

Canadian Office Action for CA Application No. 3162068, dated Dec. 12, 2024, 4 pages.

(Continued)

*Primary Examiner* — Kevin Hurley
(74) *Attorney, Agent, or Firm* — KDW FIRM PLLC

(57) ABSTRACT

A steer-by-wire device for controlling a vehicle includes a housing; an input shaft that is rotatable relative to the housing and is configured to receive a rotary input from an operator of the vehicle at a first end of the input shaft, the first end being located external to the housing; a rotor attached to the input shaft at a second, opposite, end of the input shaft, the second end being located internal to the housing; a sensor for detecting an angular position, an angular velocity, and/or an angular acceleration of the input shaft relative to the housing; and a coil for generating a magnetic field to generate a rotary force or torque in the rotor to resist rotation of the rotor. The rotor is attached to the input shaft to allow a relative movement between at least a portion of the rotor and the input shaft.

27 Claims, 9 Drawing Sheets

(56) References Cited

U.S. PATENT DOCUMENTS 12,139,207 B2 * 11/2024 Kim ....................... B62D 5/006
2019/0217885 A1 * 7/2019 Figura ................... H02K 5/161

OTHER PUBLICATIONS

European Office Action for EP Application No. 20842140.4, dated Jan. 10, 2025, 6 pages.
Canadian Office Action for Application No. 3162068 dated Aug. 30, 2023.
Chinese Office Action for Application No. 202080090290 dated Nov. 20, 2023.
International Search Report and Written Opinion for Application No. PCT/US2020/066612 dated Mar. 22, 2021.

* cited by examiner

COMPLIANT SHAFT-ROTOR COUPLING FOR IMPROVED END STOP EXIT

CROSS-REFERENCE TO RELATED APPLICATION

This is a National Stage Application filed under 35 U.S.C. 371 based on International Patent Application No. PCT/US2020/066612, filed on Dec. 22, 2020, which claims priority to U.S. Provisional Patent Application Ser. No. 62/953,655 filed Dec. 26, 2019, the disclosure of which is incorporated herein by reference in its entirety.

TECHNICAL FIELD

The invention relates to the area of brakes, clutches, resistance generating devices and motion control devices. Specifically, the invention relates to devices employing a field responsive material for controlling torque in rotary-acting devices.

BACKGROUND

Steer-by-wire devices and systems operate by transmitting a rotary motion of an input device, such as, for example, a steering wheel, to cause a corresponding movement of an output device, such as, for example, a pinion in a rack-and-pinion steering assembly, without the input device being physically connected to the output device. Thus, a rotary movement of the input device, such as, for example, an operator rotating a steering wheel, is detected and transmitted to the output device, where a corresponding movement of the output device is performed. Unlike in direct, e.g., mechanical, linkages between the input device and the output device, in a steer-by-wire application the input device is not directly connected to the output device, therefore a movement of the input device, absent the electronic transmission of a command to the output device, would not result in a corresponding movement of the output device.

Steer-by-wire applications are advantageous in many applications where a direct physical linkage, or series of linkages, connecting an input device to an output device is either impractical or impossible, whether due to physical separation between the input and output devices, intervening obstacles, and the like. The input device can comprise, for example, a steering wheel or other suitable input and an output shaft rigidly connected to the steering wheel to prevent relative movements therebetween. A Hall effect sensor is typically provided in the input device of such steering systems to provide angular position information to a steering controller that will transmit a signal to cause a corresponding movement of or within the output device. A magnet will typically be rigidly attached on an opposite end of the output shaft from the steering wheel, so as to be sufficiently adjacent to the Hall effect sensor that a rotary movement of the magnet can be detected by the Hall effect sensor. However, because of the lack of a direct connection between the input device and the output device, there are generally no mechanical restrictions to indicate, at the input device, that an end of travel has been reached at the output device. As such, it is generally necessary to induce a simulated end stop in such steer-by-wire applications.

A magnetically-responsive rotor can be attached to the output shaft of the input device, so that a rotary motion of the output shaft causes a corresponding rotary motion of the rotor having substantially the same direction and magnitude of angular rotation. This rotor can be arranged adjacent an electromagnetic coil within the input device that, when an electrical current is applied to the coil, generates a torque on the rotor that increases the amount of force that must be applied at the input device to cause further rotary movement of the output shaft and rotor. The torque that is generated can be proportional to the amount of electrical current applied to the coil. When an end stop condition has been reached at the output device, such that further displacement in a given direction of travel, whether angular, linear, or otherwise, is not mechanically possible, a maximum electrical current is applied to the coil to generate a peak end stop torque on the rotor and, correspondingly, on the output shaft to prevent further rotary movement of the input device steering wheel. It is generally known that, once this peak end stop torque is generated, this torque resists angular movement of the steering wheel in both directions, leading to what is sometimes referred to as "sticky" steering, in which the steering wheel does not naturally exit the end stop, but must instead be overcome in order to rotate the steering wheel in the opposite direction. Such "sticky" steering can make manipulation of the steering wheel by an operator more difficult by requiring the operator to overcome the peak end stop torque in order to rotate the steering wheel in the opposite direction from the end stop position. As such, a need exists for devices, systems, and/or methods for steer-by-wire that do not exhibit such "sticky" steering behaviors.

SUMMARY

In accordance with this disclosure, a steer-by-wire device is provided to control a vehicle. In one example embodiment, the steer-by-wire device comprises a housing; an input shaft that is rotatable relative to the housing and is configured to receive a rotary input from an operator of the vehicle at a first end of the input shaft, the first end being located external to the housing; a rotor attached to the input shaft at a second end of the input shaft, the second end being located internal to the housing and opposite the first end; a sensor configured to detect an angular position, an angular velocity, and/or an angular acceleration of the input shaft relative to the housing; and a coil configured to generate a magnetic field when a current is supplied to the coil, wherein the magnetic field generates a rotary force or torque in the rotor to resist rotation of the rotor; wherein the rotor is attached to the input shaft to allow a relative movement between at least a portion of the rotor and the input shaft.

In some embodiments of the steer-by-wire device, rotation of the input shaft causes a steering angle of the vehicle to change in a corresponding direction of the rotation of the input shaft.

In some embodiments of the steer-by-wire device, the input shaft is rotatable between prescribed end stops, each of the end stops corresponding to a limit of the steering angle of the vehicle.

In some embodiments of the steer-by-wire device, the relative movement between the rotor and the input shaft occurs when a direction of rotation of the input shaft is changed or reversed.

In some embodiments, the steer-by-wire device comprises pole packs of opposing polarity arranged on opposite, e.g., vertical, sides of the rotor.

In some embodiments of the steer-by-wire device, the rotor comprises a magnetically responsive material.

In some embodiments of the steer-by-wire device, the input shaft is rotatably supported within the housing by one or more bearings that are coaxially aligned with the rotor.

In some embodiments, the steer-by-wire device comprises at least one magnet rigidly attached to, or integrally formed with, the input shaft, the magnet being adjacent to the sensor.

In some embodiments of the steer-by-wire device, the sensor comprises a Hall effect sensor configured to detect a rotation of the magnet.

In some embodiments of the steer-by-wire device, a recess formed in the rotor, into which a portion of the input shaft is inserted, is dimensionally larger than the portion of the input shaft.

In some embodiments of the steer-by-wire device, when the input shaft is rotated in a first direction, the input shaft contacts an inner surface of the recess formed in the rotor at one or more first contact points; when the input shaft is rotated in a second direction, which is opposite the first direction, the input shaft contacts the inner surface of the recess formed in the rotor at one or more second contact points; after the input shaft changes a direction of rotation from the first direction to the second direction, the input shaft is spaced apart from both the first and second contact points for a period of time before contacting the second contact points to rotate the rotor in the second direction; and after the input shaft changes the direction of rotation from the second direction to the first direction, the input shaft is spaced apart from both the first and second contact points for a period of time before contacting the first contact points to rotate the rotor in the first direction.

In some embodiments of the steer-by-wire device, the input shaft and the recess of the rotor comprise a tri-drive arrangement, such that there are three first contact points and three second contact points. Any number of contact points may be used, as needed to react the torque of the device.

In some embodiments of the steer-by-wire device, the first and second contact points are first a second contact planes, respectively.

In some embodiments of the steer-by-wire device, the input shaft and the recess of the rotor comprise a square drive arrangement, such that that there are four first contact points and four second contact points.

In some embodiments of the steer-by-wire device, the rotor comprises an inner portion and an outer portion, wherein the inner portion is rotatable relative to the outer portion.

In some embodiments of the steer-by-wire device, the inner portion is connected to the outer portion by a plurality of radially oriented ribs extending between the inner portion and the outer portion, each of the ribs being arranged within a corresponding channel formed radially in the outer portion, such that each rib has a first end connected to the inner portion and a second end, opposite the first end, connected to the outer portion, with each rib being spaced apart from the outer portion along the length of each corresponding channel.

In some embodiments of the steer-by-wire device, the ribs are flexible in a direction of rotation of the input shaft to allow relative rotary movement of the inner portion relative to the outer portion.

In some embodiments of the steer-by-wire device, the outer portion comprises a plurality of slots formed in, and spaced circumferentially about, the inner radial surface of the outer portion; the inner portion comprises a plurality of radially-protruding stops, each of which are located within a corresponding one of the plurality of slots formed in the outer portion; and a gap between the stops and the slots in the direction of rotation of the input shaft is smaller than a gap defined between the ribs and the outer portion, such that the ribs do not contact the outer portion, other than at the second end, during operation of the steer-by-wire device.

In some embodiments of the steer-by-wire device, the pole packs comprise a metal, such that magnetic flux can flow through the pole packs from the coil.

In some embodiments of the steer-by-wire device, the pole packs consist of a metal, such that magnetic flux can flow through the pole packs from the coil.

In some embodiments of the steer-by-wire device, the rotor comprises an inner portion and an outer portion; the outer portion comprises a cavity defining an inner perimeter of the outer portion; the inner portion is arranged within the cavity of the outer portion; and the inner portion is flexibly coupled to the outer portion, such that the inner portion can be rotated over a first angular range of motion of the rotor without causing a corresponding rotatable movement of the outer portion of the first angular range, the first angular range being less than a total angular range of motion of the rotor between prescribed end stops, each of the end stops corresponding to a limit of the steering angle of the vehicle.

In some embodiments of the steer-by-wire device, the inner portion has an outer perimeter in a shape of an oval or ellipse and the outer portion has an inner perimeter in a shape of an oval or ellipse, the oval or ellipse of the outer perimeter of the inner portion being smaller than the oval or ellipse of the inner perimeter of the outer portion to define a circumferential gap between the inner portion and the outer portion that defines the first angular range of motion.

In some embodiments, the steer-by-wire device comprises a gasket arranged continuously around and within the gap between the inner portion and the outer portion, the gasket comprising a compliant material.

In some embodiments of the steer-by-wire device, the compliant material comprises a compressible viscoelastic material.

In some embodiments of the steer-by-wire device, the outer portion comprises a ring extending radially inwards from the inner perimeter of the outer portion; and the inner portion comprises a first inner portion and a second inner portion, which have a circumferential recess formed therein, in which the ring of the outer portion is arranged when the first inner portion and the second inner portion are assembled together within the cavity of the outer portion.

In some embodiments, the steer-by-wire device comprises a gasket arranged within the circumferential recess defined by the inner portion, such that the inner portion does not contact the outer portion when the rotor is being rotated within an angular range between prescribed end stops, each of the end stops corresponding to a limit of the steering angle of the vehicle.

In some embodiments of the steer-by-wire device, the gasket comprises a compliant material.

In some embodiments of the steer-by-wire device, the compliant material comprises a compressible viscoelastic material.

In some embodiments of the steer-by-wire device, the first inner portion and the second inner portion are secured together to rotate in unison within the cavity of the outer portion.

These and other embodiments are described in more detail in the detailed description which follows.

DETAILED DESCRIPTION

It is understood that the steer-by-wire devices, features, and methods described herein are not limited to the specific embodiments presented in the detailed description and drawings. It is recognized that these embodiments are merely illustrative of the principles of the instant subject matter. Numerous modifications and adaptations will be readily apparent to those of skill in the art without departing from the subject matter disclosed herein.

Figure 1:
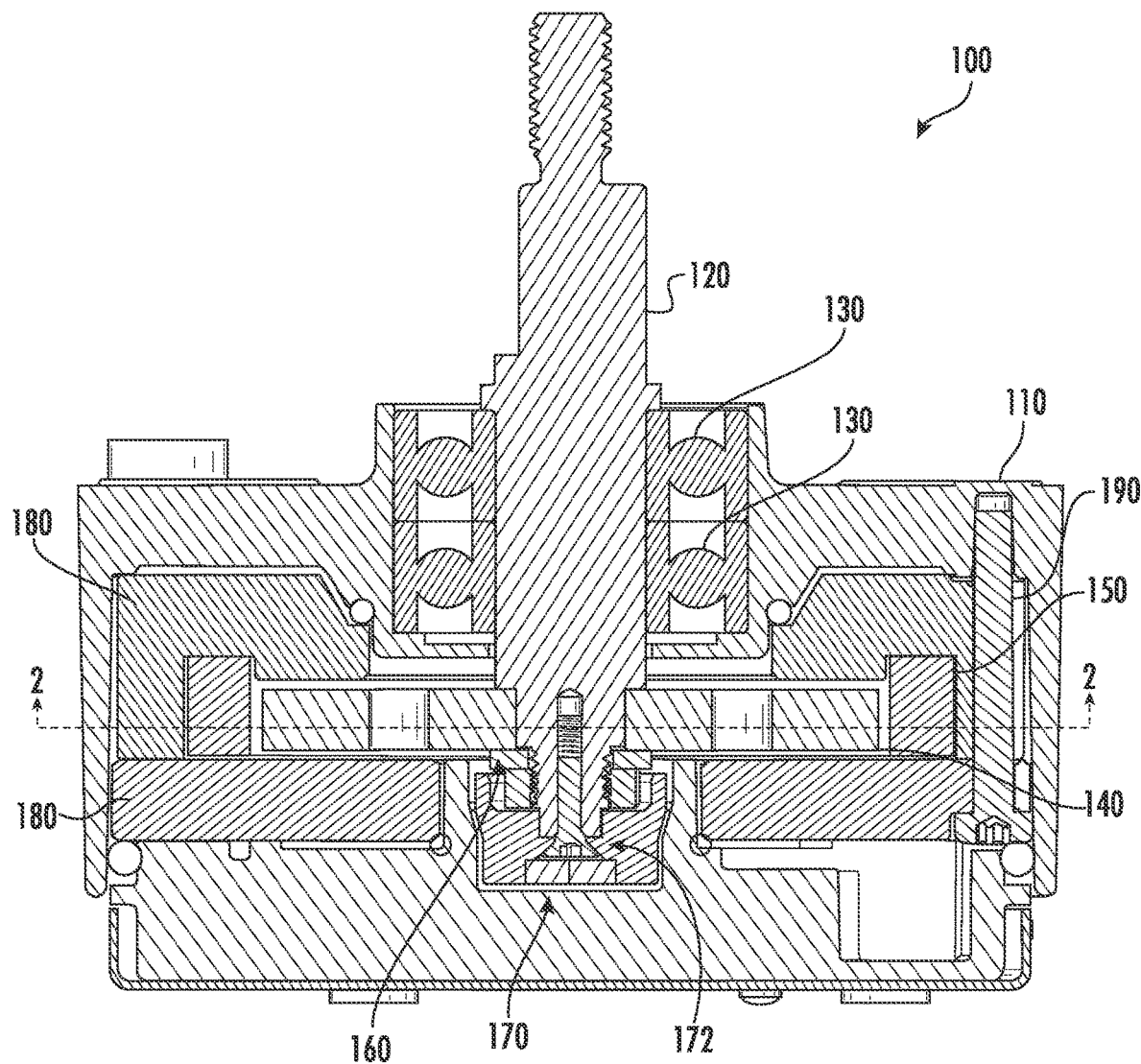
FIG. 1 is a side cross-sectional view of an example first embodiment of a steer-by-wire device.

Referring now to the figures, FIG. 1 is a cross-sectional view of an example embodiment of a steer-by-wire device, generally designated 100. The steer-by-wire device 100 has an input shaft 120 protruding through an opening formed in a housing 110. The input shaft 120 is radially supported within the opening of the housing 110 by one or more bearings 130, which can be any suitable type of bearing, including, for example, ball bearings, roller bearings, journal bearings, and the like. In the embodiment shown, a plurality of bearings 130 are shown. The input shaft 120 extends within the housing 110, beyond the bearings 130, and is attached to a rotor 140 at a proximal end of the input shaft 120, such that the input shaft 120 and the rotor 140 rotate at substantially the same angular velocity when a rotary input is transmitted to the input shaft 120 at a distal end of the input shaft 120. The proximal end and the distal end of the input shaft 120 are opposite ends of the input shaft 120. The input shaft 120 is configured to receive an input, for example, a rotary force or rotary movement, at the distal end of the input shaft 120 and to transmit this rotary force or rotary movement to the rotor 140 at the proximal end of the input shaft 120.

A magnet is rigidly attached at the proximal end of the input shaft 120, such that the magnet is concealed within the housing 110. In some embodiments, the magnet is integrally formed as a portion of the input shaft 120 and/or as an integral portion of a fastener assembling the input shaft to another of the structures of the steer-by-wire device 100. A sensor, generally designated 170, is provided to monitor and/or determine a rotary movement of the proximal end of the input shaft 120 and/or of the rotor 140. In the embodiment shown, the sensor 170 is a Hall effect sensor configured to detect an angular position, an angular velocity, and/or an angular acceleration of the magnet attached to the input shaft 120 as the input shaft 120 rotates within the housing 110. It is advantageous for the attachment of the magnet to the input shaft 120 to be rigid, allowing no, or only negligible, relative movement between the magnet and the input shaft 120 during operation of the steer-by-wire device 100. In this way, the angular position of the input shaft can be determined with sufficient accuracy and/or precision to transmit an accurate steering angle to a vehicle, or other suitable device, being controlled by the steer-by-wire device 100. As the angular position of the input shaft 120 and, consequently, the magnet, changes, the steering angle of the vehicle is changed correspondingly, either in a linear relationship or a non-linear relationship.

Figure 2:
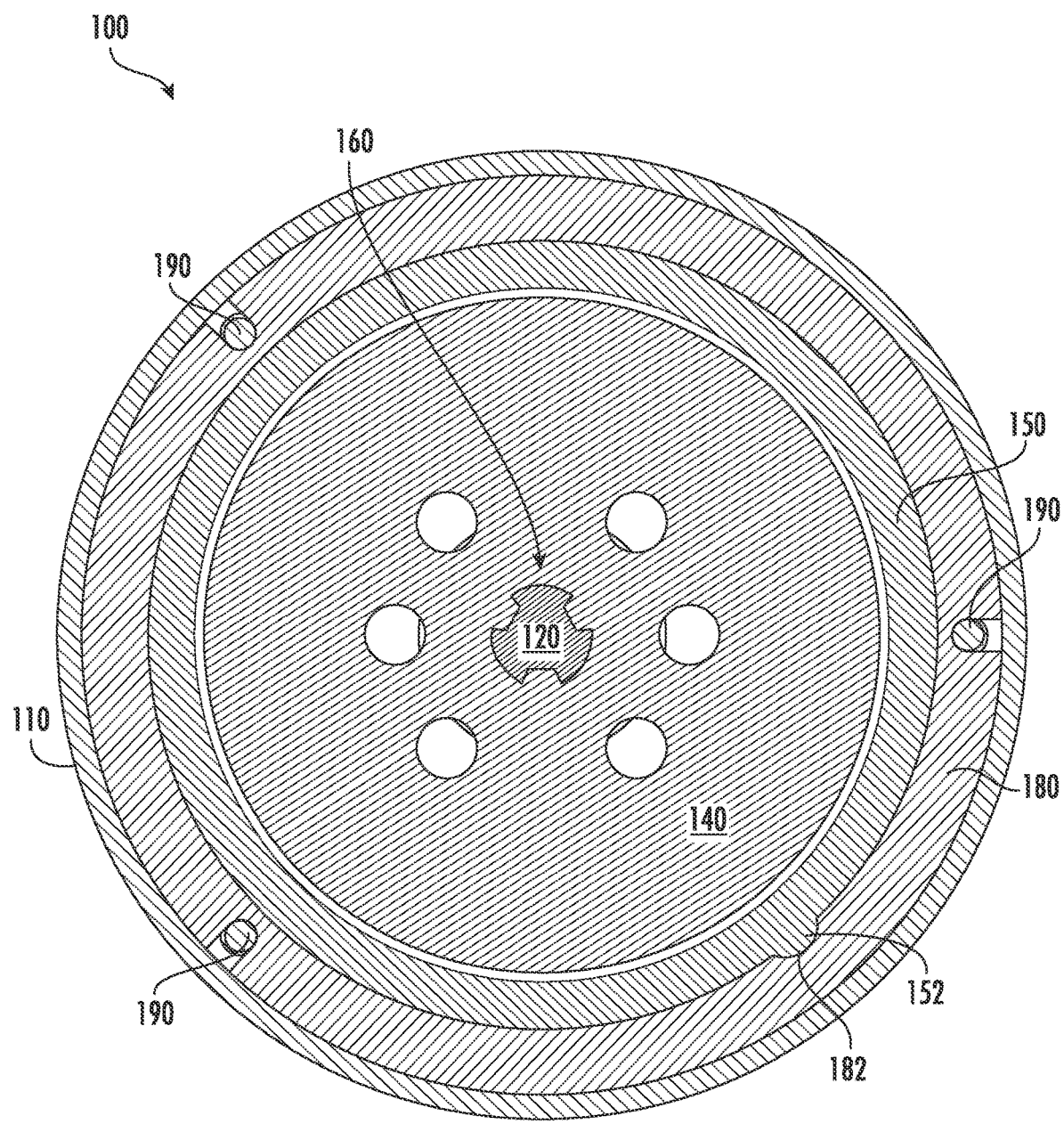
FIG. 2 is a top cross-sectional view of the steer-by-wire device of FIG. 1, taken along the cut-plane 2-2 shown in FIG. 1.

The steer-by-wire device 100 has an electric motor comprising a pole package 180. The pole package 180 comprises a coil 150 that is secured within the housing 110 by axially-oriented fasteners 190, e.g., pins, that extend through the entirety of the pole package 180 and into a recess formed in the housing 110 so that the pole package 180 cannot rotate within the housing 110, as shown in FIGS. 1 and 2. Additionally, the pole package 180 has a keyed recess 182, into which a key 152 of the coil 150 is inserted during assembly of the steer-by-wire device 100, to rotationally lock the coil 150 and the pole package 180 together with the housing 110, i.e., via the fasteners 190. The rotor 140 is radially spaced apart from the coil 150, such that the rotor 140 does not physically contact the coil 150 within the housing 110. The provision of a plurality of bearings 130 along the length of the input shaft 120 aid in ensuring that the input shaft 120 is not able to be deflected in the radial direction within the housing 110 to otherwise cause contact between the rotor 140 and the coil 150.

When electrical current is applied to the coil 150, a magnetic field is generated to generate a rotary force or torque on the rotor 140, which comprises, at least partially, a ferromagnetic material. The strength of the magnetic field and of the rotary force or torque acting on the rotor is proportional to the current being supplied to the coil 150. The rotor 140 is rotatable within a predetermined range of angular positions, the range being defined between prescribed rotational end points corresponding to maximum and/or minimum steering angles of the vehicle. The maximum steering angle and the minimum steering angle may be of a same or different magnitude in opposite directions, relative to a "zero" position, for example, a position in which the vehicle will move in a straight line. When the sensor 170 detects, via the magnet, that the input shaft 120 has been rotated to be at or beyond either of the prescribed rotational end points of the predetermined range of angular positions, a maximum current is applied to the coil 150 to generate a maximum magnetic field and, correspondingly, a maximum rotary force or torque on the rotor 140 to prevent further rotary movement of the input shaft in the direction of the rotational end point. This application of the maximum rotary force or torque on the rotor 140 prevents the input shaft from being rotated to an angular position corresponding to a steering angle beyond the maximum or minimum steering angle of which the vehicle being controlled is capable of achieving, thereby acting in the manner of an end stop of a traditional steering device, in which further rotational movement of the input shaft would be prevented by a mechanical stop. It is advantageous for the current supplied to the coil 150 be of a sufficient magnitude to prevent an operator from further rotating the input shaft beyond the prescribed rotational end points.

In some embodiments, no current is supplied to the coil 150 throughout the predetermined range of angular positions other than at the prescribed rotational end points, such that the input shaft 120 rotates freely (e.g., with no rotary force or torque) throughout the predetermined range of angular positions, other than at the prescribed rotational end points corresponding to the maximum and/or minimum steering angles of the vehicle.

In some embodiments, a current is supplied to the coil 150 when the magnet attached to the input shaft 120 is detected by the sensor 170 at any angular position other than the "zero" position. As such, a rotary force or torque is applied to the rotor 140 when the input shaft 120 and the magnet are detected as being at any angular position other than the "zero" position. In some such embodiments, the current applied is a variable current, meaning that the magnitude of the current is not constant, but varies based on the angular position of the input shaft 120 detected by the sensor 170 via the magnet. It is advantageous for the magnitude of the current to increase, either continuously or in a stepped manner, as the input shaft 120 is rotated away from the "zero" position. Due to the increased rotary force or torque being transmitted to the rotor 140 as the input shaft 120 is rotated further away from the "zero" position, the relative angular position of the input shaft 120 within the predetermined range of angular positions and, correspondingly, the steering angle of the vehicle, can be perceived by an operator based on the magnitude of the input force that must be generated by the operator to rotate the shaft, thereby providing tactile feedback to an operator of the steer-by-wire device 100. In some embodiments, a current may be supplied to the coil 150 even when the input shaft 120 is in the "zero" position, so that a rotary force or torque will be applied to the rotor when the input shaft 120 is in the "zero" position. In such embodiments, the current supplied to the coil 150 increases, for example, in a linear or nonlinear manner, as the input shaft 120 is moved away from the "zero" position in either angular direction. In some embodiments, the relationship between the magnitude of the current supplied to the coil 150 and the angular position of the input shaft 120 is linear throughout the predetermined range of angular positions, with a step from an intermediate current value, which is less than the maximum current, to the maximum current occurring when the input shaft 120 is detected as being at either of the prescribed rotational end points of the predetermined range of angular positions.

Figure 3A:
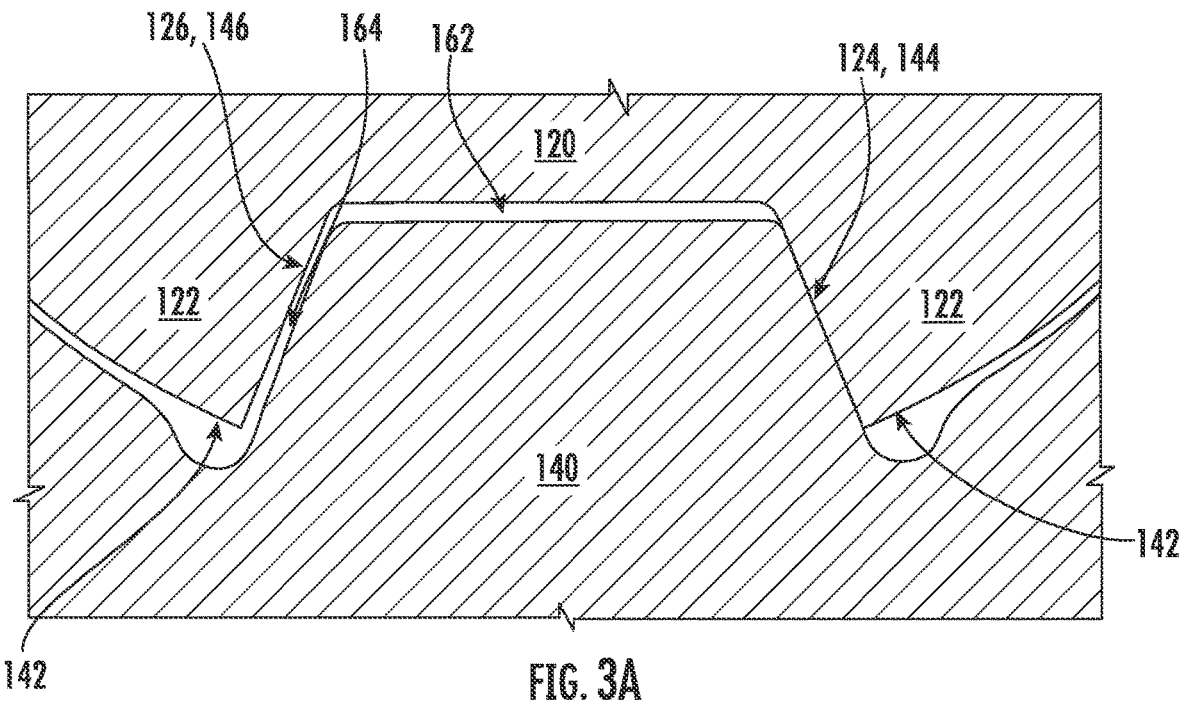
FIG. 3A is a partial top cross-sectional view of the steer-by-wire device of FIG. 1, with the input shaft rotated in a first direction, relative to the rotor.
Figure 3B:
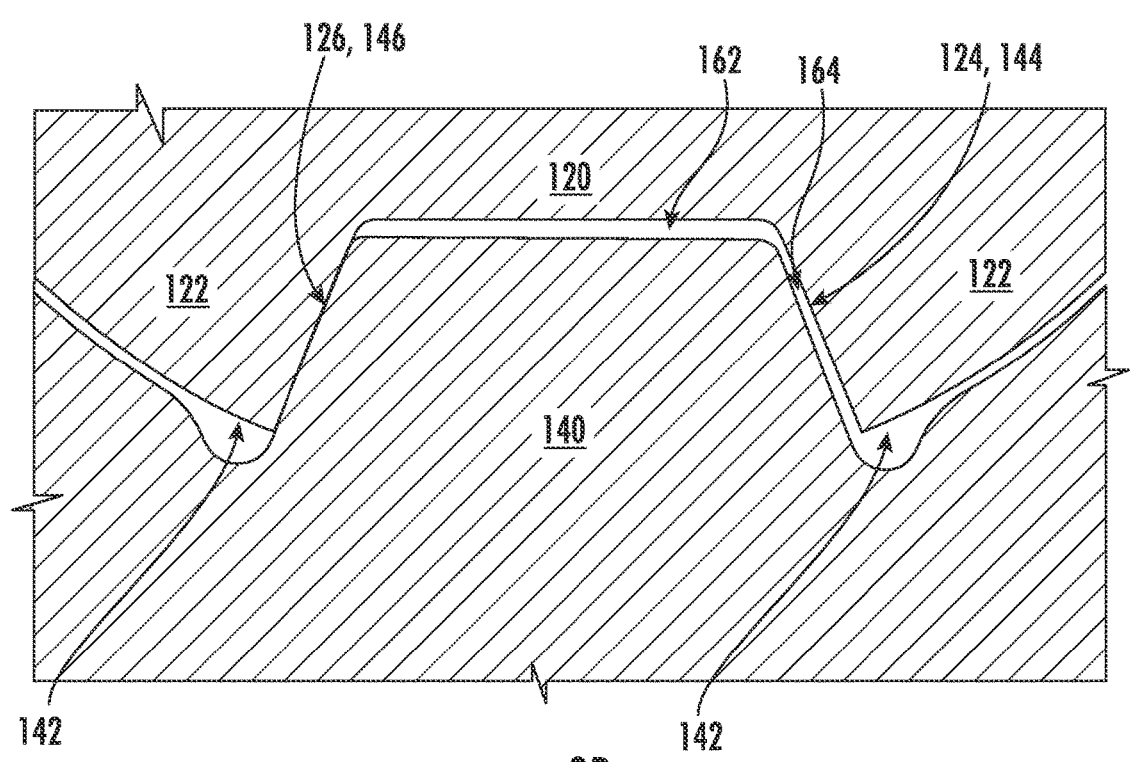
FIG. 3B is a partial top cross-sectional view of the steer-by-wire device of FIG. 1, with the input shaft rotated in a second direction, relative to the rotor, the second direction being opposite the first direction.

In order to prevent an occurrence where the rotor 140 is being held in place at either of the prescribed rotational end points by a maximum rotary force and/or torque, thereby rendering it necessary for the operator to overcome this maximum rotary force and/or torque to rotate the input shaft away from the prescribed rotational end point and towards the "zero" position, a flexible coupling region, generally designated 160, is defined where the input shaft 120 interfaces with the rotor 140. A first example embodiment of the flexible coupling region 160 is shown in FIGS. 2-3B. According to this first example embodiment, the input shaft 120 has a tri-drive configuration, with the input shaft 120 having three radially-extending tabs 122 that engage within three corresponding slots 142 formed in the inner circumferential surface of the rotor 140. The tabs 122 and slots 142 can be of any suitable dimension, quantity, and spacing about the inputs shaft 120 based on the rotary forces and/or torques that must be reacted at the flexible coupling region 160. As such, while three tabs 122 and three slots 142 are shown in the example embodiment, any number of tabs 122 and slots 142 may be provided. To enable the each of the tabs 122 to fit within a corresponding one of the slots 142, each tab 122 is dimensioned to be smaller than the slot 142 with which the tab 122 will be engaged. In some embodiments, one or more of the tabs 122 and slots 142 can be differently dimensioned from others of the tabs 122 and slots 142. In some embodiments, each tab 122 and slot 142 can be differently dimensioned from each of the other tabs 122 and slots 142, such that each pair of tabs 122 and slots 142 can be differently dimensioned from each other pair of tabs 122 and slots 142. A radial gap, generally designated 162, is provided between the input shaft 120 and the rotor 140 to allow the relative rotary movement between the input shaft 120 and the rotor 140 when the direction of rotation of the input shaft 120 is reversed, e.g., from clockwise to counterclockwise or from counterclockwise to clockwise. This radial gap 162 need not be maintained, in some embodiments, about the entire perimeter of the input shaft 120 during operation of the steer-by-wire device 100.

Each pair of tabs 122 and slots 142 also has a circumferential gap, generally designated 164, to allow the relative rotary movement between the input shaft 120 and the rotor 140 when the input shaft changes directions of rotation, as noted elsewhere herein. Each of the tabs 122 has a first contact surface 124 and a second contact surface 126, which are on opposite sides, along the circumferential direction of the input shaft 120 and/or rotor 140. Each of the slots has a first contact surface 144 and a second contact surface 146, which are on opposite sides, along the circumferential direction of the input shaft 120 and/or rotor 140. When the input shaft 120 is rotated in a first direction, e.g., a clockwise direction, as shown in FIG. 3A, the input shaft 120 is rotated relative to the rotor 140 so that the first contact surfaces 124, 144 of one or more, e.g., all, of the tabs 122 and slots 142 are in contact with each other, causing the input shaft 120 and the rotor 140 to rotate with each other. In other words, a rotary movement of the input shaft 120 will cause a rotary movement of the rotor 140 of a substantially similar magnitude. Thus, as shown in FIG. 3A, when the input shaft 120 is rotated in the first direction, the circumferential gap 164 is present between the second contact surfaces 126, 146 of the tabs 122 and slots 142, while the first contact surfaces 124, 144 of the tabs 122 and slots 142 are directly in contact with each other.

When the sensor 170 detects that the angular position of the input shaft 120 and, accordingly, the rotor 140 are at or beyond the end stop in the first direction, a maximum current is supplied to the coil 150 to generate a maximum rotary force or torque to prevent an operator from rotating the input shaft 120 and the rotor 140 further in the first direction. While this maximum current is supplied to the coil 150, the rotary force and/or torque acts on the rotor 140 to prevent rotary movement of the rotor 140 in either of the first or second directions, resulting in "sticky" steering. In conventional steer-by-wire devices, this means that it is necessary for the operator to overcome the rotary force and/or torque even to be able to rotate the input shaft 120 in the opposite direction. However, according to the presently disclosed subject matter, because of the presence of the circumferential gap 164 between the second contact surfaces 126, 146 in the second direction, the input shaft 120 may be rotated in the second direction by an amount corresponding to the dimensions of the circumferential gap 164, thereby allowing a rotation of the input shaft 120 in the second direction even when the rotor 140 is being held in place by the rotary force and/or torque. In some embodiments, the rotation of the input shaft 120 without a corresponding rotation of the rotor 140 can be, for example, between 0.5 and 2 degrees. The sensor 170 is able to detect this rotation of the input shaft 120 in the second direction, without a corresponding rotation of the rotor 140 being necessary, causing a termination of the maximum current being supplied to the coil 150 and allowing the rotor 140 to be rotated in the second direction after the input shaft 120 contacts the rotor 140 at the second contact surfaces 126, 146 of the tabs 122 and slots 142. It is advantageous for the circumferential gap 164 to be sufficiently large to allow for the angular rotation of the input shaft 120, relative to the rotor 140, to be detected by the sensor 170 prior to the input shaft 120 contacting the rotor 140 at the second contact surfaces 126, 146 of the tabs 122 and slots 142, so that the maximum current can be terminated without the operator having to overcome the maximum rotary force and/or torque to rotate the input shaft 120 in the second direction away from the first end stop.

Similarly, when the input shaft 120 is rotated in a second direction, e.g., a counterclockwise direction, as shown in FIG. 3B, the input shaft 120 is rotated relative to the rotor 140 so that the first contact surfaces 124, 144 of one or more, e.g., all, of the tabs 122 and slots 142 are in contact with each other, causing the input shaft 120 and the rotor 140 to rotate with each other. When the sensor 170 detects that the angular position of the input shaft 120 and, accordingly, the rotor 140 are at or beyond the end stop in the second direction, a maximum current is supplied to the coil 150 to generate a maximum rotary force or torque to prevent an operator from rotating the input shaft 120 and the rotor 140 further in the second direction. While this maximum current is supplied to the coil 150, the rotary force and/or torque acts on the rotor 140 to prevent rotary movement of the rotor 140 in either of the first or second directions, resulting in "sticky" steering. As shown in FIG. 3B, due to the presence of the circumferential gap 164 between the first contact surfaces 124, 144 in the first direction, the input shaft 120 may be rotated in the first direction by an amount corresponding to the dimensions of the circumferential gap 164, thereby allowing a rotation of the input shaft 120 in the first direction even when the rotor 140 is being held in place by the rotary force and/or torque. The sensor 170 is able to detect this rotation of the input shaft 120 in the first direction, without a corresponding rotation of the rotor 140 being necessary, causing a termination of the maximum current being supplied to the coil 150 and allowing the rotor 140 to be rotated in the first direction after the input shaft 120 contacts the rotor 140 at the first contact surfaces 124, 144 of the tabs 122 and slots 142. As noted elsewhere herein, it is advantageous for the circumferential gap 164 to be sufficiently large to allow for the angular rotation of the input shaft 120, relative to the rotor 140, to be detected by the sensor 170 prior to the input shaft 120 contacting the rotor 140 at the first contact surfaces 124, 144 of the tabs 122 and slots 142, so that the maximum current can be terminated without the operator having to overcome the maximum rotary force and/or torque to rotate the input shaft 120 in the first direction away from the second end stop. The rotor 140 axially floats to allow free rotation of the input shaft 120, resulting in a small amount of zero torque rotation, allowing the input shaft 120 to be rotated by an operator without having to overcome the rotary force and/or torque applied when the input shaft 120 is rotated to one of the end stops. In some embodiments, an axial load may be applied to the rotor to minimize the perception of the zero-torque rotation by the operator.

Figure 4:
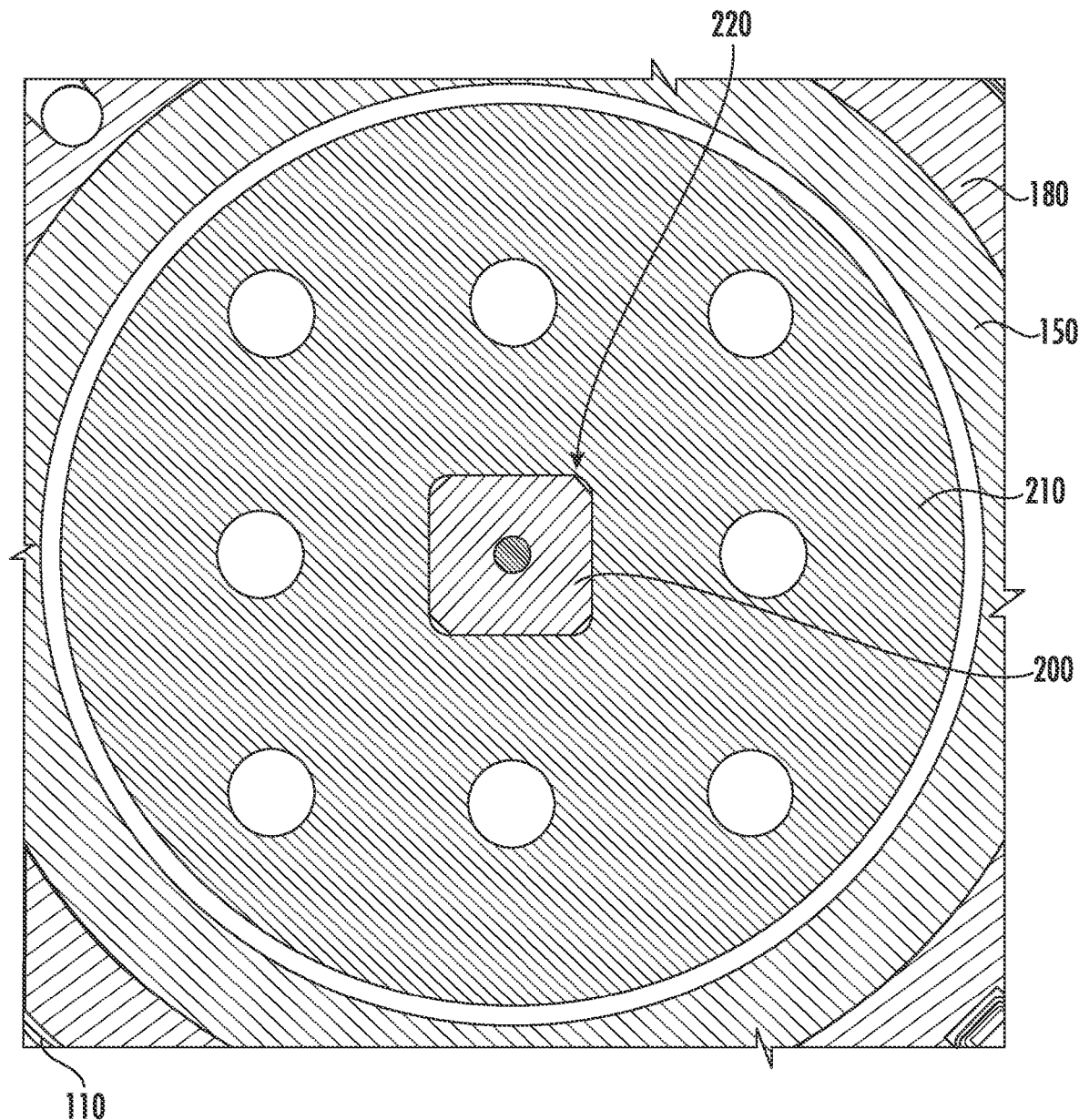
FIG. 4 is a partial top cross-sectional view of a second example embodiment of a steer-by-wire device.
Figure 5A:
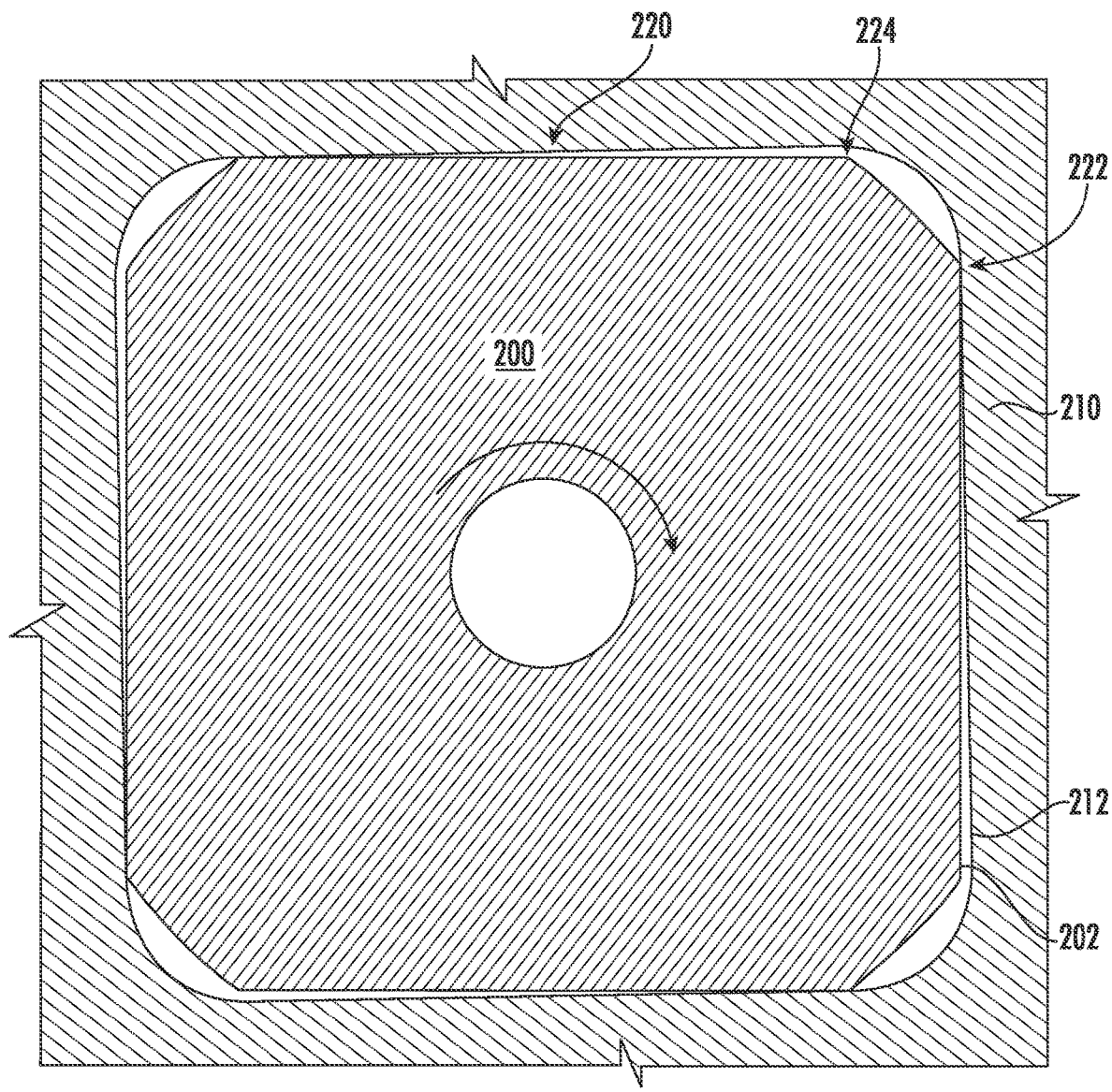
FIG. 5A is a partial top cross-sectional view of the steer-by-wire device of FIG. 4, with the input shaft rotated in a first direction.
Figure 5B:
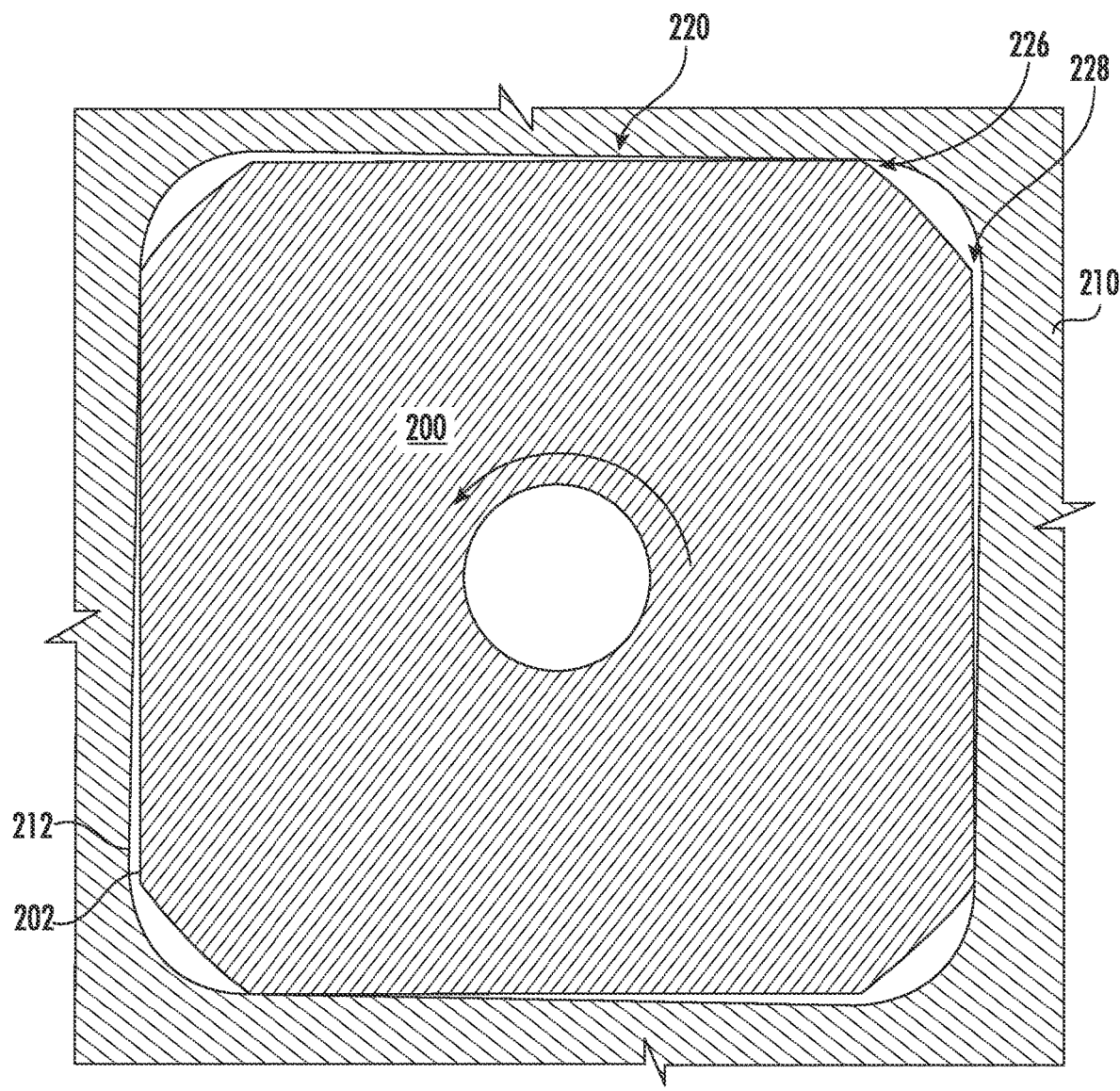
FIG. 5B is a partial top cross-sectional view of the steer-by-wire device of FIG. 4, with the input shaft rotated in a second direction, relative to the rotor, the second direction being opposite the first direction.

FIGS. 4-5B show a second example embodiment of a flexible coupling region, generally designated 220, between a second example embodiment of an input shaft 200 and rotor 210. According to this second example embodiment, the input shaft 200 and the rotor 210 are coupled together in a square-drive configuration. As such, the portion of the input shaft 200 that interfaces with the rotor 210 has a generally square-shaped cross-section, and the recess formed in the rotor 210 with which the input shaft 200 interfaces has a generally square-shaped cross-section. To allow relative movement between the input shaft 200 and the rotor 210, the recess of the rotor 210 is dimensionally larger than the input shaft 200, thereby allowing an angular movement of the input shaft 200 relative to the rotor 210.

As shown in FIG. 5A, when the input shaft 200 is rotated in the first, e.g., clockwise, direction, the input shaft 200 is rotated within the recess of the rotor 210, such that the contact surfaces 202 of the input shaft 200 are rotated to contact an adjacent one of the contact surfaces 212, e.g., an inner circumferential surface, of the recess of the rotor 210 at a first contact point, generally designated 222, with a gap 224 being present as well. In the embodiment shown, the recess is in the form of a square hole. As such, the first contact points 222 and the gap 224 are located at opposite ends of each of the contact surfaces 202, 212 of the input shaft 200 and the rotor 210. When the input shaft 200 is rotated in the first direction, the input shaft 200 is rotated relative to the rotor 210 so that the contact surfaces 202, 212 of the input shaft 200 and the rotor 210 are in contact with each other at the first contact point 222, causing the input shaft 200 and the rotor 210 to rotate with each other. In other words, a rotary movement of the input shaft 200 will cause a rotary movement of the rotor 210 of a substantially similar magnitude. Thus, as shown in FIG. 5A, when the input shaft 200 is rotated in the first direction, the gap 224 is present at an opposite end of the contact surfaces 202, 212 from the respective first contact point, where the contact surfaces 202, 212 are directly in contact with each other.

When the sensor 170 detects that the angular position of the input shaft 200 and, accordingly, the rotor 210 are at or beyond the end stop in the first direction, a maximum current is supplied to the coil 150 to generate a maximum rotary force or torque to prevent an operator from rotating the input shaft 200 and the rotor 210 further in the first direction. While this maximum current is supplied to the coil 150, the rotary force and/or torque acts on the rotor 210 to prevent rotary movement of the rotor 210 in either of the first or second directions, resulting in "sticky" steering. In conventional steer-by-wire devices, this means that it is necessary for the operator to overcome the rotary force and/or torque even to be able to rotate the input shaft 200 in the opposite direction. However, according to the presently disclosed subject matter, because of the presence of the gap 224 between the contact surfaces 202, 212 at the opposite ends of the contact surfaces 202, 212 from the first contact point 222 in the second, e.g., counterclockwise, direction, the input shaft 200 may be rotated in the second direction by an amount corresponding to the dimensions of the gap 224, thereby allowing a rotation of the input shaft 200 in the second direction even when the rotor 210 is being held in place by the rotary force and/or torque. In some embodiments, the rotation of the input shaft 200 without a corresponding rotation of the rotor 210 can be, for example, between 0.5 and 2 degrees. The sensor 170 is able to detect this rotation of the input shaft 200 in the second direction, without a corresponding rotation of the rotor 210 being necessary, causing a termination of the maximum current being supplied to the coil 150 and allowing the rotor 210 to be rotated in the second direction after the input shaft 200 contacts the rotor 210 at the second contact point, generally designated 226, of the contact surfaces 202, 212 of the input shaft 200 and the rotor 210, respectively. It should be noted that, when the contact surfaces 202, 212 are in contact with each other at the second contact point 226, a further gap, generally designated 228, is present at the opposite ends of the contact surfaces 202, 212, where the first contact points 222 were located when the input shaft was rotated in the first direction. It is advantageous for the gaps 224, 228 to be sufficiently large to allow for the angular rotation of the input shaft 200, relative to the rotor 210, to be detected by the sensor 170 prior to the input shaft 200 contacting the rotor 210 at the second contact point 226, so that the maximum current can be terminated without the operator having to overcome the maximum rotary force and/or torque to rotate the input shaft 200 in the second direction away from the first end stop.

Similarly, when the input shaft 200 is rotated in the second direction, e.g., a counterclockwise direction, as shown in FIG. 5B, the input shaft 200 is rotated relative to the rotor 210 so that the contact surfaces 202, 212 of the input shaft 200 and the rotor 210 are in contact with each other at the second contact point 226, causing the input shaft 200 and the rotor 210 to rotate with each other. When the contact surfaces 202, 212 are in contact with each other at the second contact point 226, a gap 228 is present at an opposite end of the contact surfaces 202, 212. When the sensor 170 detects that the angular position of the input shaft 200 and, accordingly, the rotor 210 are at or beyond the end stop in the second direction, a maximum current is supplied to the coil 150 to generate a maximum rotary force or torque to prevent an operator from rotating the input shaft 200 and the rotor 210 further in the second direction. While this maximum current is supplied to the coil 150, the rotary force and/or torque acts on the rotor 210 to prevent rotary movement of the rotor 210 in either of the first or second directions, resulting in "sticky" steering. As shown in FIG. 5B, due to the presence of the gap 228 between the contact surfaces 202, 212 in the first direction, the input shaft 200 may be rotated in the first direction by an amount corresponding to the dimensions of the gap 228, thereby allowing a rotation of the input shaft 200 in the first direction even when the rotor 210 is being held in place by the rotary force and/or torque. The sensor 170 is able to detect this rotation of the input shaft 200 in the first direction, without a corresponding rotation of the rotor 210 being necessary, causing a termination of the maximum current being supplied to the coil 150 and allowing the rotor 210 to be rotated in the first direction after the input shaft 200 contacts the rotor 210 at the first contact point 222 (see FIG. 5A). As noted elsewhere herein, it is advantageous for the gap 228 to be sufficiently large to allow for the angular rotation of the input shaft 200, relative to the rotor 210, to be detected by the sensor 170 prior to the input shaft 200 contacting the rotor 210 at the first contact point 222, so that the maximum current can be terminated without the operator having to overcome the maximum rotary force and/or torque to rotate the input shaft 200 in the first direction away from the second end stop.

Operation of the example embodiment shown in FIGS. 4-5B is otherwise substantially similar to the example embodiment shown in FIGS. 2-3B.

Figure 6:
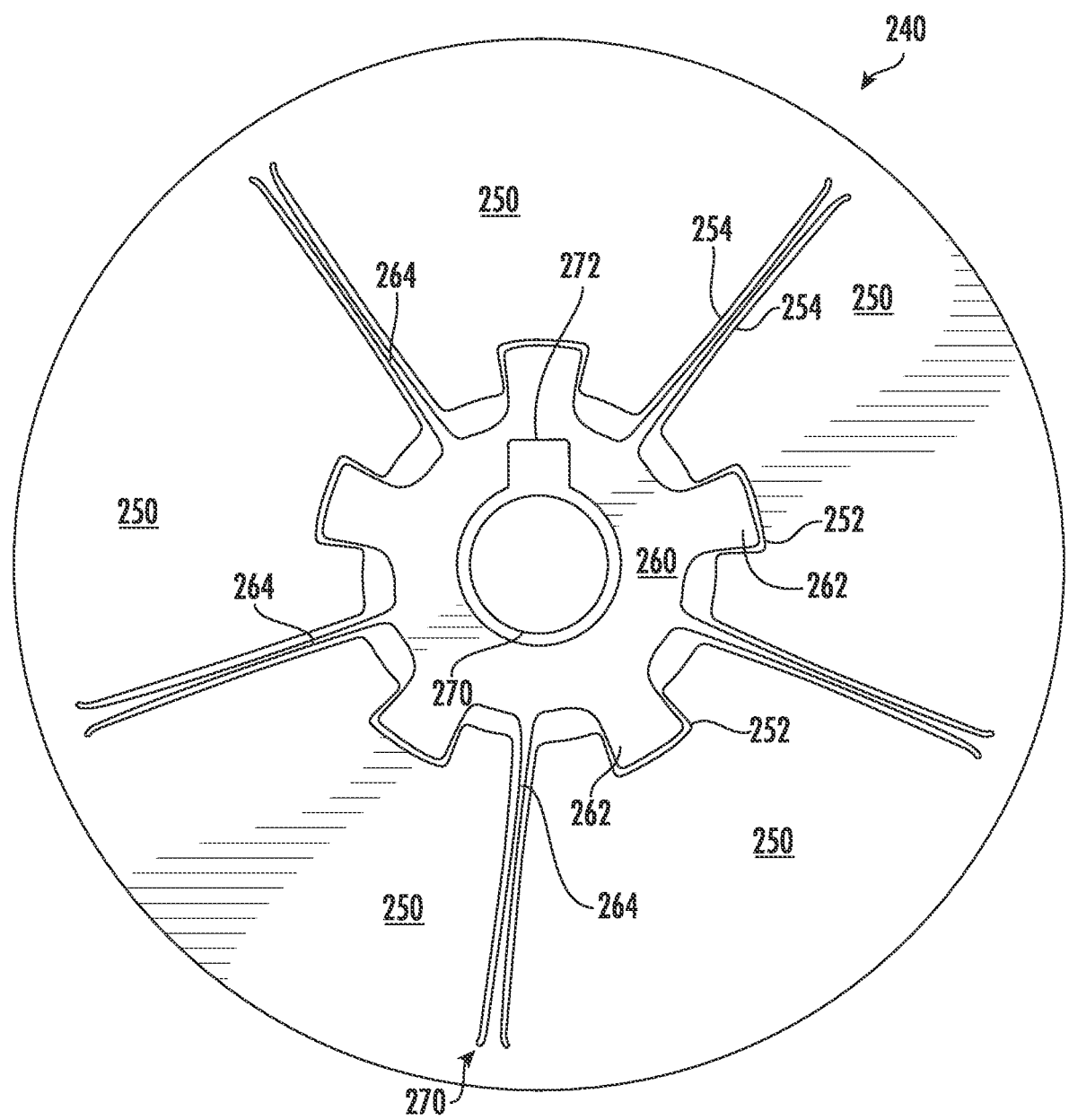
FIG. 6 is a top view of an example embodiment of a rotatably flexible rotor suitable for use in a steer-by-wire device.
Figure 7:
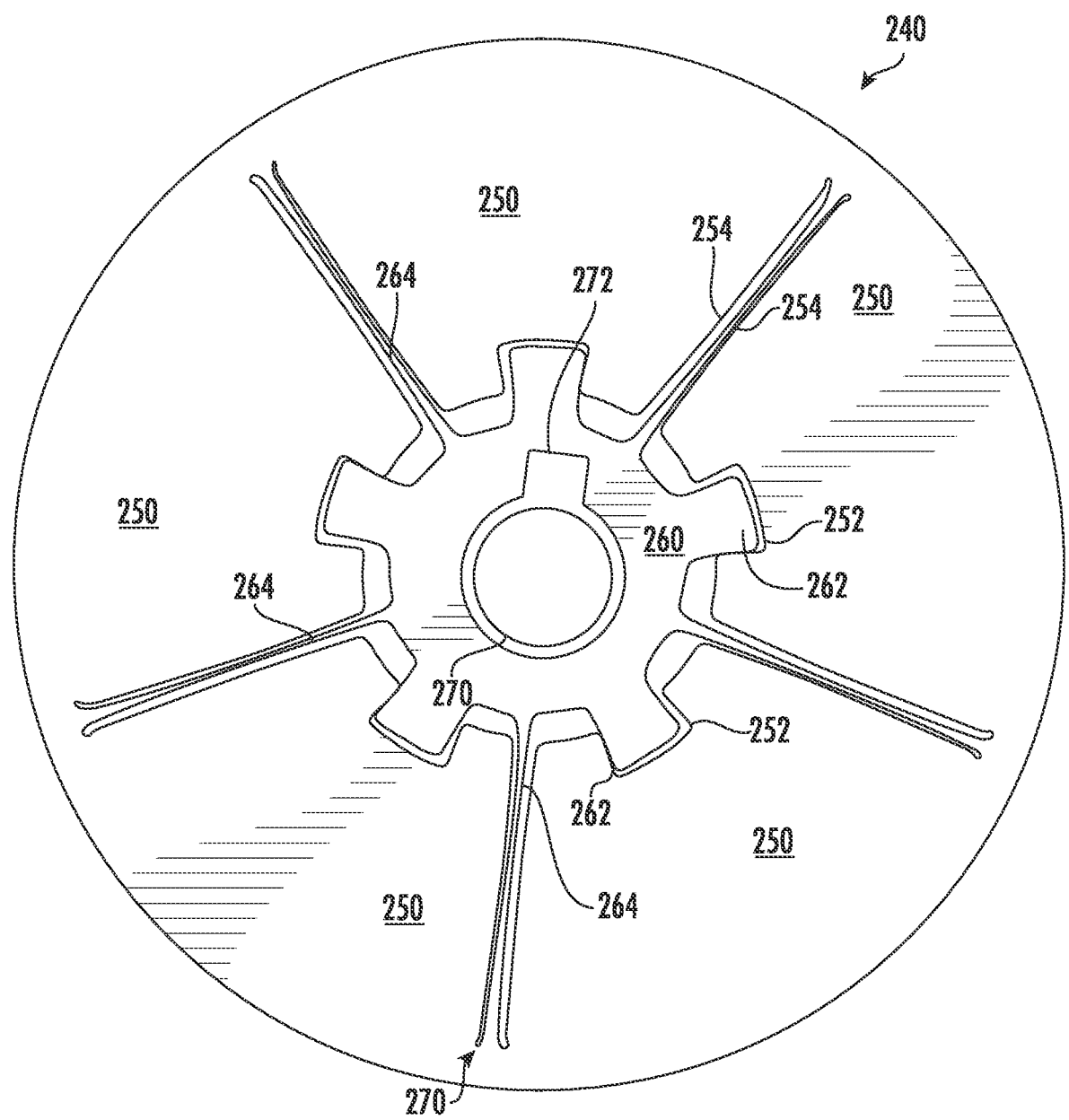
FIG. 7 is a top view of the rotatably flexible rotor of FIG. 6 with the inner portion thereof rotated relative to the outer portion.

FIGS. 6 and 7 show an example embodiment of a rotor, generally designated 240, which is suitable for use in the steer-by-wire device 100 of FIG. 1. According to this embodiment, the rotor 240 comprises an inner portion 260 that is located radially within an outer portion 250. As such, the inner portion 260 is surrounded by the outer portion 250. The input shaft passes through recess 270 and is rigidly coupled and/or attached to the inner portion 260, such that relative angular movement between the input shaft and the inner portion 260 is prevented by the input shaft lockingly interfacing with a keyed recess 272 formed in the inner portion 260. The inner portion 260 is connected to the outer portion 250 by a plurality of ribs 264 that extend in the radial direction away from the inner portion 260. While any number of ribs 264 may be provided, five ribs 264 are provided in the rotor 240 of the example embodiment shown. The ribs 264 are connected at a first end thereof to the inner portion 260 and at a second end thereof, e.g., at the connection point, generally designated 270, to the outer portion 250. Each of the ribs is arranged within a channel formed radially into the outer portion, thereby defining gaps 254 on either side of each of the ribs 264, allowing relative angular movement of the inner portion 260 relative to the outer portion 250. In some embodiments, it is advantageous for the gaps 254 to be sufficiently large that the ribs 264 will not contact the outer portion 260, other than at the respective connection points 270, during normal operation of the steer-by-wire device. The ribs 264 are flexible in a direction of rotation, e.g., in the plane defined by the rotor 240 and/or of the input shaft, to allow a relative angular movement and/or displacement of the inner portion 260 relative to the outer portion 250. The outer portion 250 comprises a plurality of slots 252 that are formed in, and spaced circumferentially about, the inner radial surface of the outer portion 250. The inner portion 260 comprises a plurality of radially-protruding stops 262, each of which are arranged and/or positioned within a corresponding one of the plurality of slots 252 formed in the outer portion 250. The dimension of the stops 262 in the circumferential direction is smaller than the dimension of the slots 252, thereby defining a circumferential gap between the stops 262 and the slots 252 and allowing angular movement of the inner portion 260 relative to the inner portion 250. The size of the gap between the stops 262 and the slots 252 define a maximum angular deflection of the inner portion 260 relative to the outer portion 250. As such, when the inner portion 260 has been rotated by a maximum specified angle, relative to the outer portion 250, the stops 262 contact the circumferential edges of the slots 252 to prevent further rotation of the inner portion 260 relative to the outer portion 250. It is advantageous for the gap between the stops 262 and the slots 252 to be smaller than the gaps 254 separating the ribs 264 from the outer portion 250 to prevent the ribs 264 from contacting the outer portion 250 other than at the connection points 270.

During normal operation, e.g., between the end stops, the input shaft and the rotor 240 rotate along with each other, such that a rotary movement of the input shaft will cause a rotary movement of the rotor 240 of a substantially similar magnitude.

When the sensor detects that the angular position of the input shaft and, accordingly, the rotor 240 are at or beyond the end stop in the first direction, a maximum current is supplied to the coil 150 to generate a maximum rotary force or torque to prevent an operator from rotating the input shaft and the rotor 240 further in the first direction. While this maximum current is supplied to the coil 150, the rotary force and/or torque acts on the rotor 240 to prevent rotary movement of the rotor 240 in either of the first or second directions, resulting in "sticky" steering. As noted elsewhere herein, in conventional steer-by-wire devices, this means that it is necessary for the operator to overcome the rotary force and/or torque even to be able to rotate the input shaft in the opposite direction. However, according to the presently disclosed subject matter, because of the presence of the ribs 264 connecting the inner portion 260 to the outer portion 250, the input shaft, as well as the inner portion 250, may be rotated relative to the outer portion 250 in the second direction by an amount corresponding to the dimensions of the circumferential gap, in the second direction, between the stops 262 and the slots 252, thereby allowing a rotation of the input shaft and the inner portion 260 in the second direction even when the outer portion 260 of the rotor 240 is being held in place by the rotary force and/or torque. In some embodiments, the rotation of the input shaft and the inner portion 260 without a corresponding rotation of the outer portion 260 of the rotor 240 can be, for example, between 0.5 and 2 degrees. The sensor is able to detect this rotation of the input shaft and the inner portion 260 in the second direction, without a corresponding rotation of the outer portion 250 of the rotor 240 in the second direction being necessary, causing a termination of the maximum current being supplied to the coil 150 and allowing the entire rotor 240 to be rotated in the second direction after the input shaft has been rotated by an angular amount sufficient to be detected by the sensor. It is advantageous for the gaps between the stops 262 and the slots 252 and between the ribs 264 and the outer portion 260 to be sufficiently large to allow for the angular rotation of the input shaft and the inner portion 260, relative to the outer portion 250 of the rotor 240, to be detected by the sensor prior to the stops 262 contacting the outer portion 250 within the slots 252, so that the maximum current can be terminated without the operator having to overcome the maximum rotary force and/or torque to rotate the input shaft in the second direction away from the first end stop. An example illustration of the inner portion 260 being rotated relative to the outer portion 250 is shown in FIG. 7, in which the stops 262 are in contact with the slots 252 and the ribs 264 are elastically deformed in the circumferential direction.

When the sensor 170 detects that the angular position of the input shaft and, accordingly, the rotor 240 are at or beyond the end stop in the second direction, a maximum current is supplied to the coil 150 to generate a maximum rotary force or torque to prevent an operator from rotating the input shaft and the rotor 210 further in the second direction. While this maximum current is supplied to the coil 150, the rotary force and/or torque acts on the rotor 240 to prevent rotary movement of the rotor 240 in either of the first or second directions, resulting in "sticky" steering. According to the presently disclosed subject matter, because of the presence of the ribs 264 connecting the inner portion 260 to the outer portion 250, the input shaft, as well as the inner portion 250, may be rotated relative to the outer portion 250 in the first direction by an amount corresponding to the dimensions of the circumferential gap, in the first direction, between the stops 262 and the slots 252, thereby allowing a rotation of the input shaft and the inner portion 260 in the first direction even when the outer portion 260 of the rotor 240 is being held in place by the rotary force and/or torque. In some embodiments, the rotation of the input shaft and the inner portion 260 without a corresponding rotation of the outer portion 260 of the rotor 240 can be, for example, between 0.5 and 2 degrees. The sensor is able to detect this rotation of the input shaft and the inner portion 260 in the first direction, without a corresponding rotation of the outer portion 250 of the rotor 210 in the first direction being necessary, causing a termination of the maximum current being supplied to the coil 150 and allowing the entire rotor 240 to be rotated in the second direction after the input shaft has been rotated by an angular amount sufficient to be detected by the sensor. It is advantageous for the gaps between the stops 262 and the slots 252 and between the ribs 264 and the outer portion 260 to be sufficiently large to allow for the angular rotation of the input shaft and the inner portion 260, relative to the outer portion 250 of the rotor 240, to be detected by the sensor prior to the stops 262 contacting the outer portion 250 within the slots 252, so that the maximum current can be terminated without the operator having to overcome the maximum rotary force and/or torque to rotate the input shaft in the first direction away from the second end stop.

Figure 8:
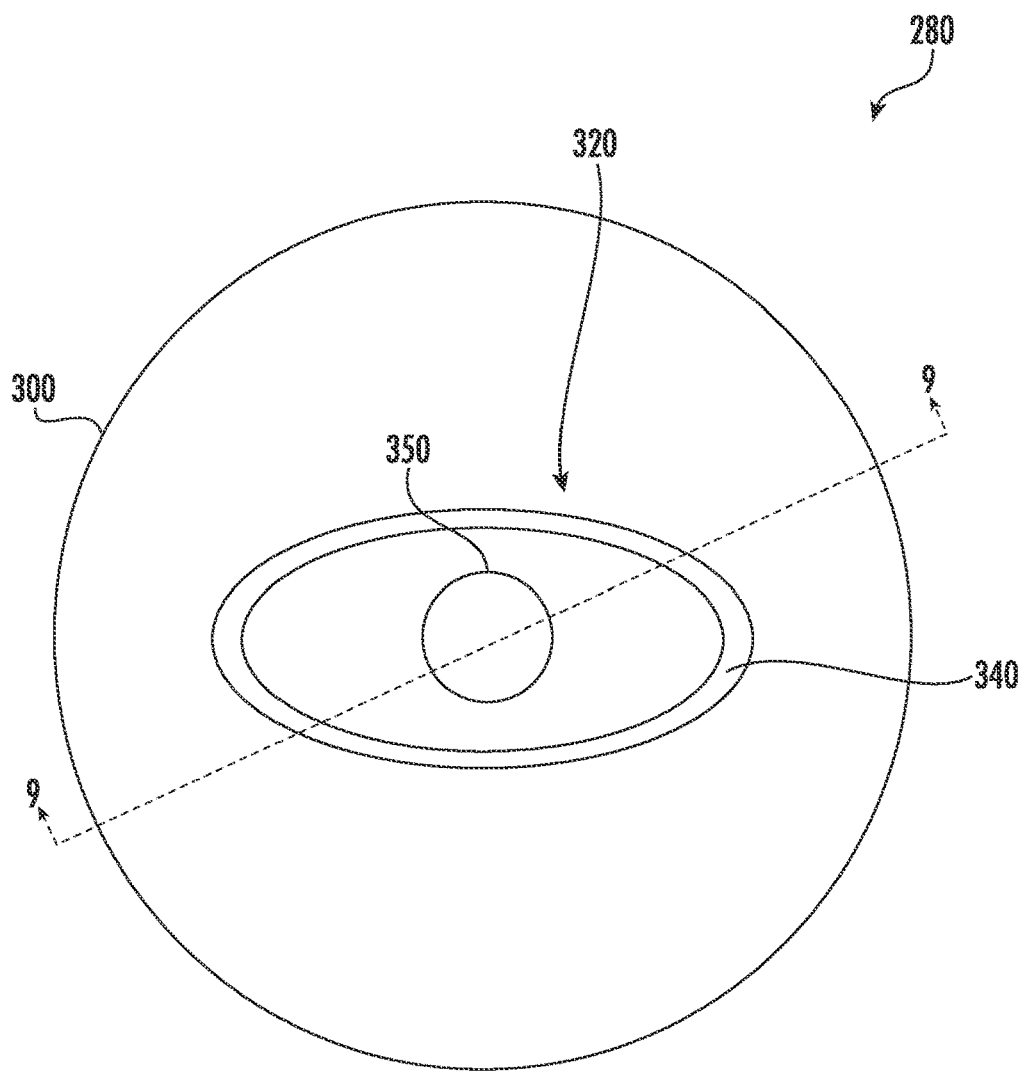
FIG. 8 is a top view of an example embodiment of a rotatably flexible rotor suitable for use in a steer-by-wire device.
Figure 9:
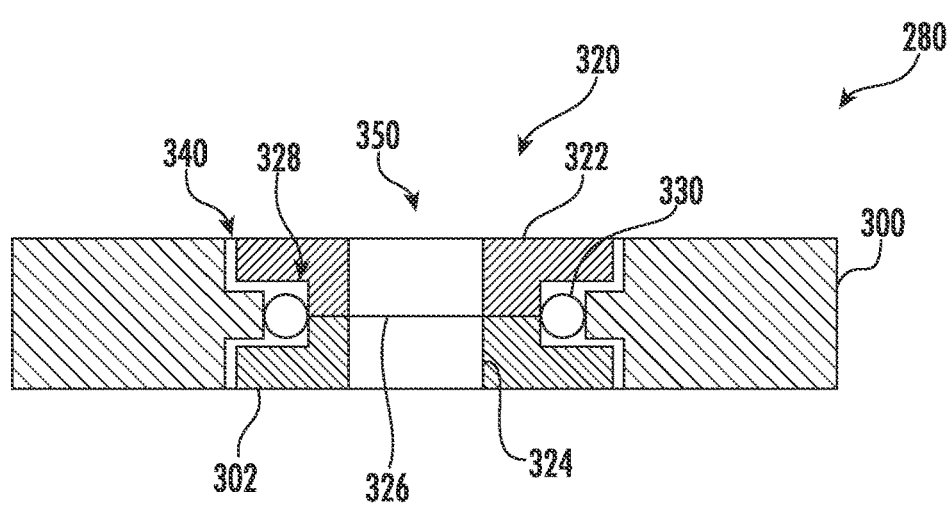
FIG. 9 is a cross-sectional view of the rotatably flexible rotor of FIG. 8.

Referring now to FIGS. 8 and 9, show an example embodiment of a rotor, generally designated 280, which is suitable for use in the steer-by-wire device 100 of FIG. 1. According to this embodiment, the rotor 280 comprises an inner portion, generally designated 320, that is located radially within an outer portion 300. As such, the inner portion 320 is surrounded by the outer portion 300. The input shaft passes through recess 350 and is rigidly coupled and/or attached to the inner portion 320, such that relative angular movement between the input shaft and the inner portion 320 is prevented by being, for example, lockingly attached to the inner portion 320. The inner portion 320 is connected to, and spaced apart from, the outer portion 300 by an annularly-shaped gasket 330 that defines a gap 340 between the inner portion 320 and the outer portion 300. It is advantageous for the gasket 330 to be a viscoelastic material that can be compressed as the inner portion 320 is rotated relative to the outer portion 300, so that the inner portion 320 can be rotated relative to the outer portion 300 when the outer portion 300 is being held stationary at an end of its travel corresponding to a maximum steering input allowed for the steer-by-wire device in which the rotor 280 is installed.

In some embodiments, the gap 340 is selected to allow a predetermined amount of relative movement between the inner portion 320 and the outer portion 300 before the inner portion 320 will contact the outer portion 300 to prevent further relative rotational movement therebetween. In some embodiments, the gasket 330 is of a sufficiently stiff durometer that the inner portion 320 and the outer portion 300 cannot make direct contact with each other during normal operation. In the embodiment shown, the inner portion 320 comprises a first half 322 and a second half 324 that are assembled together at interface edge 326. The first half 322 and the second half 324 have recessed portions that, when assembled, form a recess 328 in which the gasket 330 is positioned when the rotor 280 is assembled. The outer portion 300 comprises an inner annularly-shaped ring which is arranged within the recess 328, so that the gasket 330 can engage against this inner ring when the inner portion 320 is rotated relative to the outer portion 300. During normal operation, e.g., between the end stops, the outer portion 300 and the inner portion 320 rotate along with each other, such that a rotary movement of the inner portion 320 will cause a rotary movement of the outer portion 300 of a substantially similar magnitude.

When the sensor detects that the angular position of the input shaft, the inner portion 320, and/or the outer portion 300 are at or beyond the end stop in the first direction, a maximum current is supplied to the coil 150 to generate a maximum rotary force or torque to prevent an operator from rotating the input shaft and, accordingly, the inner portion 320 and the outer portion 300, further in the first direction. While this maximum current is supplied to the coil 150, the rotary force and/or torque acts on the outer portion 300 of the rotor 240 to prevent rotary movement of the outer portion 300 in either of the first or second directions, resulting in "sticky" steering. As noted elsewhere herein, in conventional steer-by-wire devices, this means that it is necessary for the operator to overcome the rotary force and/or torque even to be able to rotate the input shaft in the opposite direction. However, according to the presently disclosed subject matter, because of the presence of the gasket 330 and the gap 340 separating the inner portion 320 from the outer portion 300, the input shaft, as well as the inner portion 320, may be rotated relative to the outer portion 300 in the second direction by an amount corresponding to the dimensions of the gap 340 and/or the gasket 330, in the second direction, thereby allowing a rotation of the input shaft and the inner portion 320 in the second direction even when the outer portion 300 of the rotor 280 is being held in place by the rotary force and/or torque. In some embodiments, the rotation of the input shaft and the inner portion 320 without a corresponding rotation of the outer portion 300 of the rotor 280 can be, for example, between 0.5 and 2 degrees. The sensor is able to detect this rotation of the input shaft and the inner portion 320 in the second direction, without a corresponding rotation of the outer portion 300 of the rotor 280 in the second direction being necessary, causing a termination of the maximum current being supplied to the coil 150 and allowing the entire rotor 280, e.g., both the inner portion 320 and the outer portion 300, to be rotated in the second direction after the input shaft has been rotated by an angular amount sufficient to be detected by the sensor. It is advantageous for the gap 340 to be sufficiently large to allow for the angular rotation of the input shaft and the inner portion 320, relative to the outer portion 300 of the rotor 280, to be detected by the outer circumferential surface of the inner portion 320 from contacting the inner circumferential surface of the outer portion 300, so that the maximum current can be terminated without the operator having to overcome the maximum rotary force and/or torque to rotate the input shaft in the second direction away from the first end stop.

Other embodiments of a rotationally flexible rotor are contemplated, including the use of elastic members between an inner port and an outer portion, which would allow for the inner portion to be rotated by a predetermined amount due to the elastic nature of the elastic members while the outer portion is held in place by the rotary force and/or torque generated by the coil.

Other embodiments of the current subject matter will be apparent to those skilled in the art from a consideration of this specification or practice of the subject matter disclosed herein. Thus, the foregoing specification is considered merely exemplary of the current subject matter with the true scope thereof being defined by the following claims.

What is claimed is:

1. A steer-by-wire device to control a vehicle, the steer-by-wire device comprising:
   a housing;
   an input shaft that is rotatable relative to the housing and is configured to receive a rotary input from an operator of the vehicle at a first end of the input shaft, the first end being located external to the housing;
   a rotor attached to the input shaft at a second end of the input shaft, the second end being located internal to the housing and opposite the first end;
   a sensor configured to detect an angular position, an angular velocity, and/or an angular acceleration of the input shaft relative to the housing;
   a coil configured to generate a magnetic field when a current is supplied to the coil, wherein the magnetic field generates a rotary force or torque in the rotor to resist rotation of the rotor; and
   at least two pole packs arranged on opposite sides of the rotor;
   wherein the rotor is attached to the input shaft to allow a relative movement between at least a portion of the rotor and the input shaft.

2. The steer-by-wire device of claim 1, wherein rotation of the input shaft causes a steering angle of the vehicle to change in a corresponding direction of the rotation of the input shaft.

3. The steer-by-wire device of claim 2, wherein the input shaft is rotatable between prescribed end stops, each of the end stops corresponding to a limit of the steering angle of the vehicle.

4. The steer-by-wire device of claim 1, wherein the relative movement between the rotor and the input shaft occurs when a direction of rotation of the input shaft is changed or reversed.

5. The steer-by-wire device of claim 1, wherein the rotor comprises a magnetically responsive material.

6. The steer-by-wire device of claim 1, wherein the input shaft is rotatably supported within the housing by one or more bearings that are coaxially aligned with the rotor.

7. The steer-by-wire device of claim 1, comprising at least one magnet rigidly attached to, or integrally formed with, the input shaft, the magnet being adjacent to the sensor.

8. The steer-by-wire device of claim 7, wherein the sensor comprises a Hall effect sensor configured to detect a rotation of the magnet.

9. The steer-by-wire device of claim 1, wherein a recess formed in the rotor, into which a portion of the input shaft is inserted, is dimensionally larger than the portion of the input shaft.

10. The steer-by-wire device of claim 9, wherein:
    when the input shaft is rotated in a first direction, the input shaft contacts an inner surface of the recess formed in the rotor at one or more first contact points;
    when the input shaft is rotated in a second direction, which is opposite the first direction, the input shaft contacts the inner surface of the recess formed in the rotor at one or more second contact points;
    after the input shaft changes a direction of rotation from the first direction to the second direction, the input shaft is spaced apart from both the first and second contact points for a period of time before contacting the second contact points to rotate the rotor in the second direction; and
    after the input shaft changes the direction of rotation from the second direction to the first direction, the input shaft is spaced apart from both the first and second contact points for a period of time before contacting the first contact points to rotate the rotor in the first direction.

11. The steer-by-wire device of claim 10, wherein the input shaft and the recess of the rotor comprise a tri-drive arrangement, such that there are three first contact points and three second contact points.

12. The steer-by-wire device of claim 11, wherein the first and second contact points are first a second contact planes, respectively.

13. The steer-by-wire device of claim 10, wherein the input shaft and the recess of the rotor comprise a square drive arrangement, such that that there are four first contact points and four second contact points.

14. The steer-by-wire device of claim 1, wherein the rotor comprises an inner portion and an outer portion, wherein the inner portion is rotatable relative to the outer portion.

15. The steer-by-wire device of claim 14, wherein the inner portion is connected to the outer portion by a plurality of radially oriented ribs extending between the inner portion and the outer portion, each of the ribs being arranged within a corresponding channel formed radially in the outer portion, such that each rib has a first end connected to the inner portion and a second end, opposite the first end, connected to the outer portion, with each rib being spaced apart from the outer portion along the length of each corresponding channel.

16. The steer-by-wire device of claim 15, wherein the ribs are flexible in a direction of rotation of the input shaft to allow relative rotary movement of the inner portion relative to the outer portion.

17. The steer-by-wire device of claim 16, wherein:
the outer portion comprises a plurality of slots formed in, and spaced circumferentially about, the inner radial surface of the outer portion;
the inner portion comprises a plurality of radially-protruding stops, each of which are located within a corresponding one of the plurality of slots formed in the outer portion; and
a gap between the stops and the slots in the direction of rotation of the input shaft is smaller than a gap defined between the ribs and the outer portion, such that the ribs do not contact the outer portion, other than at the second end, during operation of the steer-by-wire device.

18. The steer-by-wire device of claim 1, wherein the pole packs comprise a metal, such that magnetic flux can flow through the pole packs from the coil.

19. The steer-by-wire device of claim 1, wherein:
the rotor comprises an inner portion and an outer portion;
the outer portion comprises a cavity defining an inner perimeter of the outer portion;
the inner portion is arranged within the cavity of the outer portion; and
the inner portion is flexibly coupled to the outer portion, such that the inner portion can be rotated over a first angular range of motion of the rotor without causing a corresponding rotatable movement of the outer portion of the first angular range, the first angular range being less than a total angular range of motion of the rotor between prescribed end stops, each of the end stops corresponding to a limit of the steering angle of the vehicle.

20. The steer-by-wire device of claim 19, wherein the inner portion has an outer perimeter in a shape of an oval or ellipse and the outer portion has an inner perimeter in a shape of an oval or ellipse, the oval or ellipse of the outer perimeter of the inner portion being smaller than the oval or ellipse of the inner perimeter of the outer portion to define a circumferential gap between the inner portion and the outer portion that defines the first angular range of motion.

21. The steer-by-wire device of claim 20, comprising a gasket arranged continuously around and within the gap between the inner portion and the outer portion, the gasket comprising a compliant material.

22. The steer-by-wire device of claim 21, wherein the compliant material comprises a compressible viscoelastic material.

23. The steer-by-wire device of claim 19, wherein:
the outer portion comprises a ring extending radially inwards from the inner perimeter of the outer portion; and
the inner portion comprises a first inner portion and a second inner portion, which have a circumferential recess formed therein, in which the ring of the outer portion is arranged when the first inner portion and the second inner portion are assembled together within the cavity of the outer portion.

24. The steer-by-wire device of claim 23, comprising a gasket arranged within the circumferential recess defined by the inner portion, such that the inner portion does not contact the outer portion when the rotor is being rotated within an angular range between prescribed end stops, each of the end stops corresponding to a limit of the steering angle of the vehicle.

25. The steer-by-wire device of claim 24, wherein the gasket comprises a compliant material.

26. The steer-by-wire device of claim 25, wherein the compliant material comprises a compressible viscoelastic material.

27. The steer-by-wire device of claim 23, wherein the first inner portion and the second inner portion are secured together to rotate in unison within the cavity of the outer portion.

* * * * *